United States Patent [19]

Asari et al.

[11] 4,059,896
[45] Nov. 29, 1977

[54] PROCESS FOR CONVERTING ALUMINUM SCRAP INTO USEFUL PRODUCTS

[75] Inventors: Akira Asari, Osa; Kenzou Tatsuno, Kobe, both of Japan

[73] Assignee: Kobe Steel, Ltd., Kobe, Japan

[21] Appl. No.: 701,578

[22] Filed: July 1, 1976

Related U.S. Application Data

[63] Continuation-in-part of Ser. No. 692,753, June 4, 1976, abandoned, which is a continuation of Ser. No. 573,085, April 30, 1975, abandoned.

[30] Foreign Application Priority Data

| Dec. 27, 1974 | Japan | 50-2673 |
| Dec. 27, 1974 | Japan | 50-2676 |
| Dec. 24, 1975 | Japan | 50-3166 |

[51] Int. Cl.² ............................................. B21C 23/04
[52] U.S. Cl. ......................... 29/403; 72/253 R; 29/420.5
[58] Field of Search ............... 29/403, 420.5, 180 E, 29/DIG. 47; 72/253, 270

[56] References Cited

U.S. PATENT DOCUMENTS

| 2,211,984 | 8/1940 | Paterson | 29/403 |
| 2,358,667 | 9/1944 | Stern | 29/403 |
| 2,391,752 | 12/1945 | Stern | 29/403 |
| 2,639,810 | 5/1953 | Doan | 72/270 |
| 2,967,613 | 1/1961 | Ellis et al. | 29/420.5 |
| 3,626,578 | 12/1971 | Price et al. | 29/403 |
| 3,783,494 | 1/1974 | Whalen et al. | 29/403 |

FOREIGN PATENT DOCUMENTS

| 2,274,369 | 6/1974 | France | 72/260 |

*Primary Examiner*—C.W. Lanham
*Assistant Examiner*—Daniel C. Crane
*Attorney, Agent, or Firm*—Oblon, Fisher, Spivak, McClelland & Maier

[57] ABSTRACT

A process for converting aluminum scrap into finished articles by compaction, heating and extrusion. The process comprises the steps of compacting the aluminum scrap at ambient temperature into a billet having a density between 1.8 and 2.4 g/cm³, heating the compacted billet to a temperature between 350° and 550° C, compacting the heated billet into a dense mass having a density about 2.4 g/cm³ either in an extrusion container, while maintaining conditions under which the air pressure at the outer periphery of the billet is lower than that in the central portion of the billet, or externally of the extrusion container, and subsequently, after completion of the second compaction, consolidating the secondly compacted billet by extrusion through an extrusion die fitted to the container while maintaining the above mentioned conditions, whereby void-free and scab-free finished articles of good quality are efficiently produced with a small apparatus using little energy.

7 Claims, 5 Drawing Figures

PROCESS FOR CONVERTING ALUMINUM SCRAP INTO USEFUL PRODUCTS

CROSS-REFERENCE TO RELATED APPLICATIONS

This is a continuation-in-part application of application Ser. No. 692,753, filed June 4, 1976, now abandoned, which in turn, is a continuation of application Ser. No. 573,085 filed Apr. 30, 1975, now abandoned.

BACKGROUND OF THE INVENTION

1. Field of the Invention

This invention relates in general to a process for the treatment of metal scrap or waste and, more particularly, to a process for recycling or converting aluminum scrap or waste into finished articles.

2. Description of the Prior Art

It is known in the art to produce finished articles from metal scrap by compression, heating and extrusion. In one of the prior expedients disclosed, for example, in U.S. Pat. No. 3,626,578, scrap metal such as titanium, zirconium, molybdenum, columbium, tantalum, tungsten, steel, or the like, is compacted into a billet having an average density of at least 70% of the theoretical density of the metal. The compacted billet is heated to a plastic deformation temperature sufficient for hot working and thereafter consolidated by hot extrusion so that the billet is deformed into a dense mass having a density between 90 and 100% of the theoretical complete density of the metal.

For scrap metal such as aluminum, it has heretofore been proposed to heat the aluminum scrap and subsequently consolidate the scrap by extrusion in vacuo.

It has also heretofore been proposed to consolidate the aluminum scrap into useful articles by compression, heating and extrusion. In some cases, the aluminum scrap is crushed and cleaned before it is compressed by mechanical pressure methods.

As is apparent from these prior art expedients, it is possible to compress and heat aluminum scrap before it is extruded and, in some cases, it may be possible to complete the extrusion of the aluminum scrap in an evacuated state. In actual practice, however, recycling of aluminum scrap into usable articles through extrusion presents severe and specific difficulties which are inherent in the nature of the aluminum scrap itself.

It is preferred that, before the extrusion step, the aluminum scrap be compressed to make the density of the scrap conform as closely as possible to the theoretical density of the metal to obtain finished articles of high quality sufficient for commercial use. Nevertheless, difficulties occur since the press required must be massive and consumes a large amount of energy as well as requiring a large mounting space.

A drawback is also encountered in the extrusion step performed under vacuum in that the flow rate of the exhausted air sucked by the vacuum pump per unit time is limited in practice. Consequently, if a vacuum must be created for each extrusion step, the working time ratio of the extrusion press is low.

Moreover, as is well known, aluminum is recognized as a metal having a relatively high consolidation rate. This property would seem to be advantageous in the extrusion of aluminum scrap. However, instead it poses a serious problem in obtaining a substantially void-free, dense and scab-free product in the extrusion step. More specifically, when the individual scrap particles constituting the aluminum scrap are compressed, they are deformed. An increase in the compression pressure causes metallic contact of the scrap particles and their consolidation into metallic bodies. Since, in this instance, metallic union of the individual scrap particles is completed within an extremely short period of time because of the high consolidation rate of the scrap metal, exhausted air trapped between the scrap particles cannot escape out of the metallic bodies. This results in the formation of voids or perforations in the final product. These voids or perforations in the metal cause deterioration of mechanical properties such as strength and corrosion resistance. In addition, because of these defects, bloated portions are formed near the surface of the finished product in the course of the extrusion thereby providing poor surface appearance of the extruded article. These bloated portions will hereinafter be referred to as scabs. When the finished articles contain scabs on their surfaces, the commercial value of the recycled products is significantly reduced.

In summary, it has been theoretically recognized that it is advantageous to perform the extrusion of aluminum scrap in a vacuum or after the compression of the aluminum scrap into a mass with a density close to the theoretical complete density of the aluminum metal. These techniques aid in eliminating the formation of voids or perforations during treatment of the aluminum scrap including compression, heating nd extrusion. However, these expedients have disadvantages as discussed hereinabove in that an increase in energy consumption and design of a large-size apparatus are required.

Moreover, it is extremely difficult to produce void-free and scab-free finished articles using apparatus of limited size with a limited amount of energy consumption. Consequently, there is a need for a new process for treating scrap aluminum whereby the finished product will be free of these defects.

SUMMARY OF THE INVENTION

Accordingly, it is a principal object of the present invention to provide a process for producing finished articles of high quality from aluminum scrap or waste in a stable and highly efficient manner while substantially eliminating the formation of voids or perforations as well as scabs during the recycling steps including compressing, heating and extrusion.

It is another object of the present invention to provide a process for producing finished articles from aluminum scrap or waste, by which the finished articles are free from voids or scabs even when a small-size press is utilized and the energy consumption required for the process is reduced.

Briefly, these and other objects of this invention, as will hereinafter be made clear by the ensuing discussion, have been achieved by providing a process wherein a compression step is performed at least twice, prior to and after the heating of the aluminum scrap or waste respectively, under conditions by which exhausted air in the compressed billets can be discharged therefrom in the most efficient manner for promoting metallic union of the scrap particles whereby the formation of voids or perforations in the metal is substantially eliminated during the subsequent extrusion step, the extrusion of the final product being performed subsequent to the completion of the second compaction.

BRIEF DESCRIPTION OF THE DRAWINGS

These and other objects, features and advantages of the present invention will become more apparent from the following description when taken in conjunction with the accompanying drawings, in which.

DETAILED DESCRIPTION OF THE ILLUSTRATED EMBODIMENTS

Figure 1:
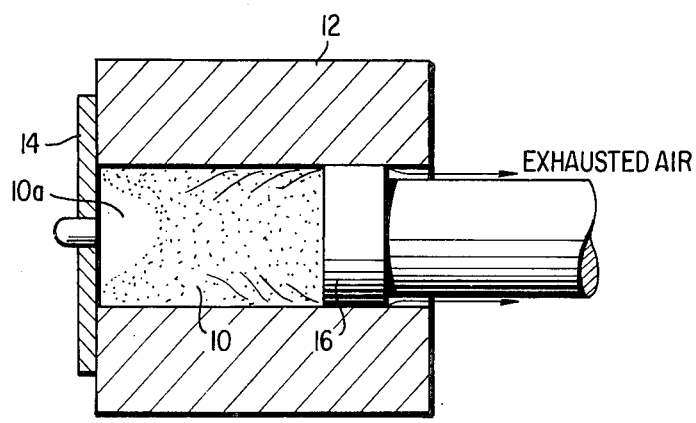
FIGS. 1 through 3 are views illustrating distribution patterns of voids or perforations while the extrusion of a billet is in progess, and after the billet has been subjected to a first and, after heating, second compression, respectively, in accordance with an important feature of the present invention.

According to an important feature of the present invention, the process comprises the steps of compacting aluminum scrap or waste at ambient temperature into a billet having a density between 1.8 and 2.4 g/cm$^3$, heating the compacted billet to a temperature between 350° and 550° C, placing the heated billet in an extrusion press and compacted the heated billet into a dense mass having a density above 2.4 g/cm$^3$ while maintaining conditions under which exhausted air at the outer periphery of the compacted billet is lower in pressure than that at the central portion of the compacted billet, and extruding the secondly compacted billet from the extrusion press through an extrusion die to form a finished article after completion of the second compaction step. Alternatively, the second compaction may be performed outside of the extrusion container and after completion thereof, placed in the extrusion container for performance of the extrusion.

The formation of voids or scabs in the finished article can be satisfactorily prevented by reducing the volume of exhausted air contained in the billet as much as possible prior to starting the extrusion and preventing the exhausted air in the billet from passing through the extrusion die during the extrusion step.

The present invention is based upon the recognition that the consolidation of the scrap particles is more greatly reduced by oxide products formed on the surfaces of the scrap particles in the billet during heating than by those formed at ambient temperature. Also, while the size of the compaction apparatus for the billet and the magnitude of energy required therefor increase considerably with the required density of the billet, a heated billet can be compacted with less energy and with apparatus remarkably smaller in size than that required for compacting the billet at ambient temperature to the same density.

During the extrusion step, the consolidation of the scrap particles occurs in varying degrees depending upon various factors relating to the compacted billet, such as, for example, temperature, pressure, the presence of oxide products and/or impuities, the flow of the exhausted gas, metal, and the like. Especially good consolidation is obtained when the beginning of the consolidation of the scrap particles and the flow of the exhausted air in the billet are suitably controlled.

At least two compactings of the aluminum scrap, before and after heating, respectively, are advantageous in minimizing both the size of the apparatus required for the compacting step and the energy required, and in controlling the degree of formation of the oxide products in the billet by heating.

The lower limit of the density of the billet is 1.8 g/cm$^3$ in the first compacting step because this value is the limit below which the billet is not self-sustaining. Additionally, at this density the contact area between the scrap particles and the atmosphere during the heating step is so large that the amount of oxide products formed in the billet prevents complete consolidation of the scrap particles during the extrusion step.

The upper limit of the density of the billet required in the first compacting step is 2.4 g/cm$^3$, for above this value, both the size of the apparatus required for the compacting step and the energy required become extremely large. Also, at higher values, it is difficult to maintain the rate of consolidation of the scrap particles in the outer periphery of the billet to be lower than that of the scrap particles near the central portion of the billet.

If the billet has in its outer periphery a portion in which the consolidation rate is less than that in the central portion of the billet, exhausted air at the central portion of the billet will be allowed to escape therefrom toward the outer periphery of the billet. Therefore, the exhausted air can be satisfactorily discharging during the extrusion step since the consolidation of the scrap particles progresses from the central portion of the billet toward the outer periphery thereof.

The lower limit of the density of the billet required in the second compacting step is 2.4 g/cm$^3$, below which the amount of exhausted air remaining in the billet is excessive. This is a problem because this air is subsequently discharged therefrom in an extremely large amount in the course of the extrusion step. In such large amounts, the discharged exhausted air can pass through the extrusion die. This can occur because in the course of this second compacting step, the billet is heated to a temperature between 350° and 550° C, as required for hot working by extrusion.

Due to the conditions outlined above for the first step, the degree of oxidation at the central portion of the billet is less than that at the outer periphery of the billet. Thus, in this compacting step, the consolidation of the scrap particles should occur initially at the central portion of the billet and exhausted air can become trapped therein. Consequently, it is necessary to avoid this phenomenon by maintaining conditions under which the gas pressure at the outer periphery of the billet is held at a level lower than that at the central portion of the billet. The air pressure at the outer periphery of the billet is the pressure in the space between the outer periphery of the billet and the inner surface of the extrusion press bore.

Figure 2:
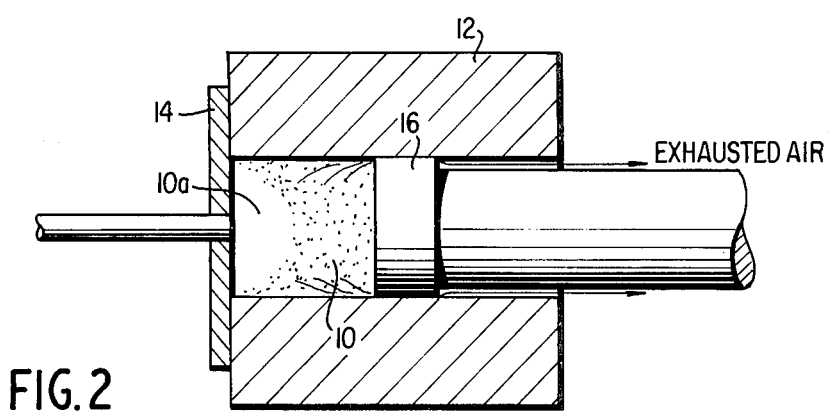
Figure 3:
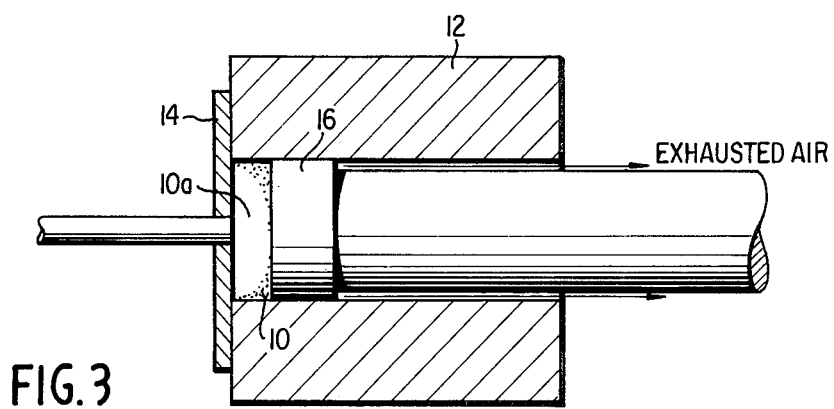

Referring now to FIGS. 1 through 3, there is shown the relationship between the consolidation of the scrap particles and the flow of exhausted air in the billet. After the first compacting step, the heating step, and the second compacting step have been performed, a billet 10 is heat treated in an extrusion press container 12 before extrusion by maintaining the above-stated pressure conditions. In this instance, consolidation of the scrap particles will progress in the billet 10 from an extrusion die 14 toward the extrusion plunger or ram 16, and from the central portion toward the outer periphery of the billet 10 in the course of extrusion, the consolidated portion being indicated as 10a in FIGS. 1 through 3.

As the extrusion of the billet 10 progresses, the exhausted air in the billet 10 is caused to flow from a portion near the die 14 toward the extrusion plunger 16 and from the central portion toward the outer peripheral portion of the billet 10 in the manner shown by the arrows in FIGS. 1 to 3. The exhausted air escapes from the billet 10 without being trapped between the scap particles. It is essential in this instance that the consolidation of the scap particles occurs in the outer periphery of the billet 10 after it has already occurred at the central portion of the billet 10, and that the amount of oxide products produced at the outer periphery of the billet 10 be larger than that produced at the central portion in the course of heating.

It will now be appreciated that in accordance with the present invention, exhausted air in the billet is caused to be discharged therefrom simultaneously with the consolidation of the scrap particles during extrusion of the billet whereby a void-free and scab-free finished article of good quality is obtained. It will also be noted that the process of the present invention does not require a large-size apparatus and a small amount of energy is sufficient.

As previously discussed, it is preferred that the pressure at the outer periphery of the billet be less than that of the exhausted air in the central portion of the billet in order to facilitate complete consolidation of the scrap particles. This is attained by heating the billet to create a temperature gradient to promote leakage of exhausted air from the extrusion container in the course of the second compacting step.

More specifically, the billet is preferably heated such that the temperature gradient is greater along the axis of the billet whereby the temperature of the billet is higher near the die than near the extrusion plunger. This causes the exhausted air escaping from the billet to pass in a more preferable manner through a clearance between the extrusion container and the plunger during the second compacting step.

The above-stated condition is obtained by evacuating exhausted air from the extrusion container by using a vacuum pump prior to or during the second compacting of the billet. Although the amount of exhausted air sucked by the vacuum pump in the second compacting step is approximately equal to the amount of exhausted air in the compacted billet after the first compacting step has been performed and is less than the amount of exhausted air evacuated in the prior art processes, the purpose of the present invention can be satisfactorily achieved.

Moreover, as will be subsequently discussed, since the purpose of the present invention can be achieved even in the case where the exhausted air in the extrusion container is not completely evacuated, the evacuating step of the present invention differs substantially from that of the prior art processes. That is, the process of the present invention provides a finished article of good quality even when an extremely small amount of exhausted air is evacuated.

In summary, the process of the present invention is carried out by compacting aluminum scrap or waste at ambient temperature into a billet having a density between 1.8 and 2.4 $g/cm^3$, heating the compacted billet to a temperature between 350°–550° C, compacting the heated billet into a dense mass having a density greater than 2.4 $g/cm^3$ while maintaining conditions under which air pressure at the outer periphery of the heated billet is lower than that in the central portion of the heated billet, and consolidating the compacted billet by extrusion while maintaining the above-stated conditions to form a finished article of good quality.

It should be additionally emphasized that in accordance with the present invention, the extrusion step is to be performed independently of, and subsequent to, the completion of the second compaction step, in order to achieve the objects of the present invention, and in conjunction therewith, while the second compaction step may be performed within the extrusion container prior to the performance of the extrusion, if the extrusion die orifice is left open, as seen, for example, within FIG. 1, then it is to be understood that the second compaction step will be performed while permitting some of the material to be discharged through the extrusion orifice. This discharged material, however, is not the final, extruded product or finished article.

More particularly, such material is discharged from the die and the extrusion container only until the remainder of the material within the extrusion container has undergone the predetermined amount of compaction, that is, so as to have a density above 2.4 $g/cm^3$. Subsequently, upon attaining the desired compaction, the discharged material is severed from the material within the extrusion container and re-cycled within the process so as to be utilized again within a subsequent compaction step and a subsequent extrusion of a finished article. The portion of the material within the extrusion container, which has now undergone the predetermined amount of compaction, within the second compaction step, is now ready to be extruded as the final or finished product or article.

Alternatively, the die orifice may be closed or blocked, and consequently, when the second compaction step is performed within the extrusion container, the compaction takes place without any discharge of the material. Upon completion of the second compaction step to the predetermined degree, the die orifice may then be uncovered and extrusion of the compacted material may then be permitted to occur.

Still yet further, the second compaction step may likewise be performed externally of the extrusion container, whereupon compacting the material to the predetermined degree, the compacted material may then be inserted within the extrusion container extrusion of the final or finished product or article performed.

Having generally described the invention, a more complete understanding can be obtained by reference to certain specific examples, which are included for purposes of illustration only, and are not intended to be limiting, unless otherwise specified.

EXAMPLE 1

Aluminum scrap in the form of foil was first compacted into a plurality of billets, each of a cylindrical shape having an axial length less than the diameter, and each of the billets having a density of 2.36 $g/cm^3$. These billets were heated and thereafter placed in an extrusion container in a face-to-face manner. The billets were then heated to create a temperature gradient along the axis of the billets such that the billet adjacent to the die was heated to a temperature of 520° C while the billet adjacent to the extrusion plunger or ram was heated to a temperature of 400° C.

The billets in the container were then subjected to a second compaction step so as to compact the same into a dense mass with a density of 2.55 $g/cm^3$ while the air pressure in the container was maintained slightly higher than atmospheric pressure The billets were subjected to hot working by direct extrusion through an extruding die mounted on the container thereby producing a finished article.

Figure 4:
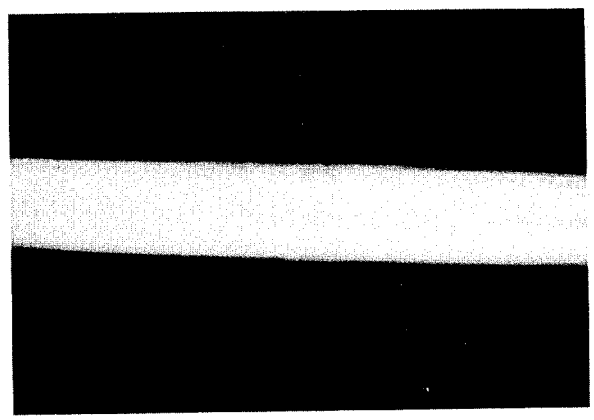
FIG. 4 is a photographic view of a finished article produced in accordance with the present invention.

The finished article was substantially free from voids and scabs as can be seen in the photograph shown in FIG. 4. The test revealed that the pressure required for the first compacting of the billets was only 300 tons, even for billets of 150 mm in diameter.

EXAMPLE 2

Scraps of aluminum sections were crushed and a first compaction was accomplished producing a billet having a density of 1.86 g/cm$^3$. The compacted billet was heated to a temperature of 450° C, and the heated billet was then placed in the extrusion container and subjected to a second compaction until the density of the billet approached 2.5 g/cm$^3$. The air pressure in the extrusion container was maintained lower than atmospheric pressure.

The second compaction of the billet was achieved under conditions in which the air in the extrusion container was evacuated through a small clearance between the container and the plunger or ram by a vacuum pump, and thereafter, the billet was subjected to hot working by direct extrusion thereby producing a finished article.

The finished article thus formed was of good quality similar to that shown in FIG. 4. The pressure required for the first compaction of the billet was only 300 tons, even for a billet of 150 mm in diameter. The slight amount of exhausted air evacuated by means of the vacuum pump was sufficient to maintain the pressure in the container slightly lower than atmospheric pressure.

EXAMPLE 3

Aluminum cans were crushed, and trapped oil was completely removed therefrom. The crushed aluminum cans were first compacted into a billet, until the density approached 2.15 g/cm$^3$, and the compacted billet was then heated to a temperature of 470° C. The heated billet was placed in the extrusion container and a second compaction of the billet was carried out producing a dense mass, having a density of 2.52 g/cm$^3$, by fitting the ram or plunger into the container and evacuating the container until the pressure therein reached a value lower than atmospheric pressure. Thereafter, the compacted billet was subjected to hot working by direct extrusion through the die mounted on the container.

The finished article thus obtained was of good quality similar to that shown in FIG. 4. The pressure required for achieving the first compaction of the billet was only 250 tons, even for a billet of 150 l mm in diameter. Since it was unnecessary to provide a complete vacuum in the container, the intended purpose was accomplished by operating a small vacuum pump for a short period of time.

COMPARATIVE EXAMPLE 1

This example illustrates a case of failure wherein the process was carried out without following the present invention, and more particularly, wherein the heated billet was subjected to hot working by direct extrusion without submitting the billet to the second compaction noted in Example 1.

Figure 5:
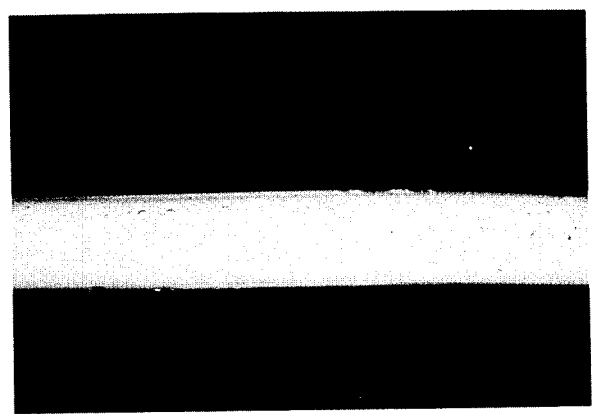
FIG. 5 is a view similar to FIG. 4 but showing a finished article produced in accordance with a conventional process.

A finished article obtained by this process is illustrated in the photograph in FIG. 5. As can be clearly seen from this photograph, the finished article was of poor quality and contained many voids and scabs. It is assumed that this phenomenon occurred because the total volume of exhausted air in the container, before the extrusion was accomplished, was too large to allow the exhausted air to escape from the billet during the extrusion step.

It will be understood from the foregoing description that in accordance with the present invention, it is possible to obtain a void-free and scab-free finished article of good quality from aluminum scrap or waste by meeting various essential features of the present invention even when a billet is compacted by a small apparatus using a small amount of energy, and that the process of the present invention does not involve energy losses as in prior art remelting methods. Therefore, the process of the present invention is highly useful for industrial purposes.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for converting aluminum scrap into a finished article, comprising the steps of:
   compacting the aluminum scrap at ambient temperature into a billet having a density between 1.8 and 2.4 g/cm$^3$;
   heating the compacted billet to a temperature between 350° and 550° C;
   compacting the heated billet into a dense mass, having a density above 2.4 g/cm$^3$, while maintaining a condition under which the air pressure at the outer periphery of the billet is lower than that in the central portion of the billet; and
   subsequently extruding the billet after completion of the second compaction thereof from an extrusion container through an extrusion die, while maintaining said condition, so as to form the finished article.

2. The process of claim 1, wherein:
   said second compaction is performed within said extrusion container.

3. The process of claim 2, wherein:
   said condition, under which the air pressure at the outer periphery of the billet is lower than that in the central portion of the billet, is maintained by heating the billet so as to create a temperature gradient therein,
   thereby allowing exhausted air in the extrusion container to escape therefrom during the second compaction step.

4. The process of claim 3, wherein:
   the temperature gradient is created along the axis of the billet, such that the portion of the billet near said die has a temperature higher than that of the portion near the ram inserted in the extrusion container,
   whereby exhausted air is discharged from the extrusion container through a clearance between the container and the ram during the second compaction step.

5. The process of claim 2, wherein:
   said condition, under which the air pressure at the outer periphery of the billet is lower than that in the central portion of the billet, is maintained by evacuating exhausted air from said extrusion container by a vacuum pump during the second compaction step.

6. The process of claim 2, wherein:
said condition, under which the air pressure at the outer periphery of the billet is lower than that in the central portion of the billet, is maintained by evacuating exhausted air from said extrusion container prior to the second compaction step.

7. The process of claim 1, wherein:
a plurality of billets are formed in said first compaction step and these billets are simultaneously compacted in the second compaction step and thereafter extruded.

* * * * *